(12) United States Patent
Bae et al.

(10) Patent No.: US 10,261,884 B2
(45) Date of Patent: Apr. 16, 2019

(54) METHOD FOR CORRECTING VIOLATION OF SOURCE CODE AND COMPUTER READABLE RECORDING MEDIUM HAVING PROGRAM PERFORMING THE SAME

(71) Applicant: SURESOFT TECHNOLOGIES INC., Seoul (KR)

(72) Inventors: Hyun Seop Bae, Seoul (KR); Jun Kim, Daejeon (KR); Seung-uk Oh, Seoul (KR); Hyo Jae Jang, Gyeonggi-do (KR); Min Hyuk Kwon, Gyeonggi-do (KR)

(73) Assignee: SURESOFT TECHNOLOGIES INC., Seoul (KR)

( * ) Notice: Subject to any disclaimer, the term of this patent is extended or adjusted under 35 U.S.C. 154(b) by 0 days.

(21) Appl. No.: 15/632,161

(22) Filed: Jun. 23, 2017

(65) Prior Publication Data

US 2018/0074939 A1 Mar. 15, 2018

(30) Foreign Application Priority Data

Sep. 13, 2016 (KR) .................. 10-2016-0118171

(51) Int. Cl.
*G06F 11/36* (2006.01)
*G06F 11/07* (2006.01)
*G06F 11/10* (2006.01)

(52) U.S. Cl.
CPC ...... *G06F 11/3624* (2013.01); *G06F 11/0793* (2013.01); *G06F 11/1056* (2013.01)

(58) Field of Classification Search
CPC ............. G06F 11/3624; G06F 11/0793; G06F 11/1056

(Continued)

(56) References Cited

U.S. PATENT DOCUMENTS

| 7,707,552 | B2 * | 4/2010 | Schmidt | G06F 11/3604 714/38.14 |
| 7,962,832 | B2 * | 6/2011 | Bae | G06F 11/0751 714/763 |

(Continued)

FOREIGN PATENT DOCUMENTS

| KR | 20040096259 | 11/2004 |
| KR | 20160025426 | 3/2016 |

OTHER PUBLICATIONS

Office Action for Korean Patent Application No. KR 10-2016-0118171, Jul. 3, 2017, 6 Pages (With Concise Explanation of Relevance).

*Primary Examiner* — Marina Lee
(74) *Attorney, Agent, or Firm* — Fenwick & West LLP

(57) ABSTRACT

The present disclosure relates to a method for correcting violation of a source code and a computer readable recording medium having a program performing the same, and more particularly to a method for correcting violation of a source code, which automatically corrects the defect of a source code and a computer readable recording medium having a program performing the same. The method for correcting violation of a source code includes: a violation detection step in which a source code is analyzed and one or multiple violations are detected; a correction information generation step in which multiple pieces of the correction information for correcting the detected violation are generated; a correction information merging step in which the multiple pieces of the generated correction information are merged; and a correction step in which the source code is corrected on the basis of the merged correction information.

14 Claims, 21 Drawing Sheets

(58) Field of Classification Search
USPC .......................................... 717/132, 154, 156
See application file for complete search history.

(56) References Cited

U.S. PATENT DOCUMENTS

| | | | | |
|---|---|---|---|---|
| 8,572,583 | B2* | 10/2013 | Bae | G06F 11/3668 |
| | | | | 702/119 |
| 8,875,110 | B2* | 10/2014 | Lee | G06F 11/3604 |
| | | | | 717/142 |
| 9,792,443 | B1* | 10/2017 | Sheridan | G06F 21/577 |
| 2007/0089092 | A1* | 4/2007 | Schmidt | G06F 8/10 |
| | | | | 717/126 |
| 2012/0167060 | A1* | 6/2012 | Landwehr | G06F 11/3604 |
| | | | | 717/132 |
| 2013/0014093 | A1* | 1/2013 | Lee | G06F 8/75 |
| | | | | 717/142 |
| 2013/0179863 | A1* | 7/2013 | Vangala | G06F 8/74 |
| | | | | 717/124 |
| 2013/0339929 | A1* | 12/2013 | Logozzo | G06F 9/44589 |
| | | | | 717/124 |
| 2014/0196010 | A1* | 7/2014 | Balachandran | G06F 8/71 |
| | | | | 717/124 |
| 2015/0135166 | A1* | 5/2015 | Tarlow | G06F 8/34 |
| | | | | 717/125 |
| 2017/0212829 | A1* | 7/2017 | Bales | G06F 11/3664 |
| 2018/0074939 | A1* | 3/2018 | Bae | G06F 11/3624 |

\* cited by examiner

Fig. 3

```
1
2  void func() {
3    int a, b;
4
5    a = 5l; b = a;
6  }
7
```
<ORIGINAL>

```
1
2  void func() {
3    int a, b;
4
5    a = 5L; b = a;
6  }
7
```
<CORRECTION>

Fig. 4

```
1
2  void func() {
3    int a, b;
4
5    a = 5l; b = a;
6  }
7
```
<ORIGINAL>

```
1
2  void func() {
3    int a, b;
4
5    a = 5lu; b = a;
6  }
7
```
<CORRECTION>

Fig. 5

```
1
2  void func() {
3      int a, b;
4
5      a = 5l; b = a;
6  }
7
```
<ORIGINAL>

```
1
2  void func() {
3      int a, b;
4
5      a = 5l;
6      b = a;
7  }
8
```
<CORRECTION>

Fig. 6

```
                1 2 3 4 5 6 7 8 9 10  COLUMN NUMBER
                ★
SOURCE CODE     a = 5 l ; b = a ;
ORIGINAL
                ★
diff1           a = 5 L ; b = a ;
                ★
diff2           a = 5 l u ; b = a ;
                ★
diff3           a = 5 l ;

mergedDiff
```

Fig. 7

```
                 1 2 3 4 5 6 7 8 9 10  COLUMN NUMBER
                     ★
SOURCE CODE    a = 5 l ; b = a ;
ORIGINAL
                     ★
diff1          a = 5 L ; b = a ;
                     ★
diff2          a = 5 l u ; b = a ;
                     ★
diff3          a = 5 l ;

mergedDiff     a
```

Fig. 8

```
                 1 2 3 4 5 6 7 8 9 10  COLUMN NUMBER
                       ★
SOURCE CODE    a = 5 l ; b = a ;
ORIGINAL
                       ★
diff1          a = 5 L ; b = a ;
                       ★
diff2          a = 5 l u ; b = a ;
                       ★
diff3          a = 5 l ;

mergedDiff     a =
```

Fig. 9

```
              1 2 3 4 5 6 7 8 9 10  COLUMN NUMBER
                      ★
SOURCE CODE  a = 5 I ; b = a ;
ORIGINAL
                      ★
diff1        a = 5 L ; b = a ;
                      ★
diff2        a = 5 I u ; b = a ;
                      ★
diff3        a = 5 I ;

mergedDiff   a = 5
```

Fig. 10

```
              1 2 3 4 5 6 7 8 9 10  COLUMN NUMBER
                      ★
SOURCE CODE  a = 5 I ; b = a ;
ORIGINAL
                      ★
diff1        a = 5 L ; b = a ;
                      ★
diff2        a = 5 I u ; b = a ;
                      ★
diff3        a = 5 I ;

mergedDiff   a = 5 L
```

Fig. 11

```
                    1 2 3 4 5 6 7 8 9 10   COLUMN NUMBER
                                ★
SOURCE CODE     a = 5 |  ;  b = a  ;
ORIGINAL
                                ★
diff1           a = 5 L  ;  b = a  ;
                                   ★
diff2           a = 5 | u  ;  b = a  ;
                              ★
diff3           a = 5 |  ;

mergedDiff      a = 5 L u
```

Fig. 12

```
                    1 2 3 4 5 6 7 8 9 10   COLUMN NUMBER
                                   ★
SOURCE CODE     a = 5 |  ;  b = a  ;
ORIGINAL
                                   ★
diff1           a = 5 L  ;  b = a  ;
                                      ★
diff2           a = 5 | u  ;  b = a  ;
                              ★(END)
diff3           a = 5 |  ;

mergedDiff      a = 5 L u  ;
```

Fig. 13

```
                 1  2  3  4  5  6  7  8  9  10   COLUMN NUMBER
                                   ★
SOURCE CODE   a  =  5  l  ;  b  =  a  ;
ORIGINAL
                                   ★
diff1         a  =  5  L  ;  b  =  a  ;
                                         ★
diff2         a  =  5  l  u  ;  b  =  a  ;
                              ★(END)
diff3         a  =  5  l  ;

mergedDiff    a  =  5  L  u  ;
```

Fig. 14

```
                 1  2  3  4  5  6  7  8  9  10   COLUMN NUMBER
                                      ★
SOURCE CODE   a  =  5  l  ;  b  =  a  ;
ORIGINAL
                                      ★
diff1         a  =  5  L  ;  b  =  a  ;
                                         ★
diff2         a  =  5  l  u  ;  b  =  a  ;
                              ★(END)
diff3         a  =  5  l  ;

mergedDiff    a  =  5  L  u  ;
```

Fig. 15

```
                     1 2 3 4 5 6 7 8 9 10  COLUMN NUMBER
SOURCE CODE    a = 5 | ; b = a ★;
ORIGINAL
diff1          a = 5 L ; b = a ★;

diff2          a = 5 | u ; b = a ★;
                              ★(END)
diff3          a = 5 | ;

mergedDiff     a = 5 L u ;
```

Fig. 16

```
                     1 2 3 4 5 6 7 8 9 10  COLUMN NUMBER
                                           ★(END)
SOURCE CODE    a = 5 | ; b = a ;
ORIGINAL                                   ★(END)
diff1          a = 5 L ; b = a ;
                                             ★(END)
diff2          a = 5 | u ; b = a ;
                              ★(END)
diff3          a = 5 | ;

mergedDiff     a = 5 L u ;
```

Fig. 17

```
1
2  void func() {
3     int a, b;
4
5     a = 5l; b = a;
6  }
```
<ORIGINAL>

```
1
2  void func() {
3     int a, b;
4
5     a = 5Lu;
6  }
```
<CORRECTION>

Fig. 18

```
1
2  void func() {
3     int a, b;
4
5     a = 5l; b = a;

6  }
```
<ORIGINAL>

```
1
2  void func() {
3     int a, b;
4
5     a = 5Lu;
6     b = a;
7  }
```
<CORRECTION>

Fig. 19

RULE 1: AN if STATEMENT MUST HAVE A BRACE.

<RULE>

```
1
2
3
4  void func() {
5      if ( . . . )        //RULE 1 VIOLATION (VIOLATION 1)
6          if ( . . . )    //RULE 1 VIOLATION (VIOLATION 2)
7              expression;
8  }
9
```

<SOURCE CODE ORIGINAL>

Fig. 20

```
1
2
3
4  void func() {
5      if ( . . . )
   ////////////////
6      if ( . . . )
7          expression;
   ////////////////
8  }
```
<ORIGINAL>

```
1
2
3
4  void func() {
5      if ( . . . )
6      {
7          if ( . . . )
8              expression;
9      }
10 }
```
<CORRECTION>

Fig. 21

```
1
2
3
4  void func() {
5      if ( . . . )
6          if ( . . . )
7              expression;
8  }
```
<ORIGINAL>

```
1
2
3
4   void func() {
5       if ( . . . )
6           if ( . . . )
7           {
8               expression;
9           }
10  }
```
<CORRECTION>

Fig. 22

```
1
2  void func() {
3      if ( . . . )
4          if ( . . . )
5              expression;
6  }
7
```
<ORIGINAL>

```
1
2  void func() {
3      if ( . . . )
4      {
5          if ( . . . )
6              expression;
7  }
8
```
<CORRECTION>

Fig. 25

```
1
2  void func() {
3      if ( ... )
           ////////////////
4          if ( ... )
           ////////////////
5          expression;
           ////////////////
6  }
7
```
<ORIGINAL>

```
1
2   void func() {
3       if ( ... )
4       {
5           if ( ... )
6           {
7               expression;
8           }
9       }
10  }
11
```
<CORRECTION>

Fig. 26

RULE 1: AN if STATEMENT MUST HAVE A BRACE.
RULE 2: AN if STATEMENT MUST HAVE AN ELSE STATEMENT.

<RULE>

```
1
2  void func() {
3      if ( ... )      //RULE 1 VIOLATION (VIOLATION 1)
4          expression;    RULE 2 VIOLATION (VIOLATION 2)
5  }
6
```

<SOURCE CODE ORIGINAL>

Fig. 27

```
1
2  void func() {
3      if ( . . . )
4      expression;
5  }
6
```
<ORIGINAL>

```
1
2  void func() {
3      if ( . . . )
4      {
5      expression;
6      }
7  }
8
```
<CORRECTION>

Fig. 28

```
1
2  void func() {
3      if ( . . . )
4      expression;
5  }
```
<ORIGINAL>

```
1
2  void func() {
3      if ( . . . )
4      expression;
5      else
6      {
7      }
8  }
```
<CORRECTION>

Fig. 29

```
1
2  void func() {
3      if ( . . . )
   ▨▨▨▨▨▨▨▨▨▨▨
4      expression;
5  }
6
```
<ORIGINAL>

```
1
2  void func() {
3      if ( . . . )
4      {
5      expression;
6  }
7
```
<CORRECTION>

Fig. 30

```
1
2  void func() {
3      if ( . . . )
   ▨▨▨▨▨▨▨▨▨▨▨
4      expression;
   ▨▨▨▨▨▨▨▨▨▨▨
5  }
6
```
<ORIGINAL>

```
1
2  void func() {
3      if ( . . . )
4      {
5      expression;
6      }
7  }
8
```
<CORRECTION>

METHOD FOR CORRECTING VIOLATION OF SOURCE CODE AND COMPUTER READABLE RECORDING MEDIUM HAVING PROGRAM PERFORMING THE SAME

CROSS-REFERENCE TO RELATED APPLICATION

This application claims priority under 35 U.S.C. § 119(a) to Republic of Korea Patent Application No. 10-2016-0118171 filed on Sep. 13, 2016, which is incorporated by reference herein in its entirety.

BACKGROUND

Field

The present disclosure relates to a method for correcting violation of a source code and a computer readable recording medium having a program performing the same, and more particularly to a method for correcting violation of a source code, which automatically corrects the defect of a source code and a computer readable recording medium having a program performing the same.

Description of the Related Art

A static code analysis is one of various computer software analysis methods. The method has a feature of performing an analysis on the source code of software under development without directly executing the software.

A static analysis tool is a program developed to automatically perform a static program analysis by using software instead of a human hand. In general, a source code has a very large size, so that it can be found that it is almost impossible to perform the static program analysis one by one by human hand operation. Therefore, it can be said that the static analysis tool functions to automatically perform such an analysis. The static analysis tool is able to detect various kinds of defects or vulnerabilities of the source code in accordance with its type and to notify the defects detected through the analysis to a user.

Such a static analysis tool type of a source code analysis apparatus has been previously proposed. However, the source code analysis apparatus which has been previously proposed or used provides limited functions of detecting defects and generating a detection message of the defect. Therefore, a process of correcting the detected defects has a limitation of being dependent on personal knowledge and experiences of the user (programmer).

Also, when thousands to tens of thousands of the defects are detected by the source code analysis apparatus which has been previously proposed or used, a lot of time is required to correct such numerous defects one by one. Particularly, even when some of the numerous defects are very simple, a lot of time is required for repetitively correcting the defects one by one.

One conventional technology is disclosed in Korean Patent No. 10-1623174 (hereinafter, referred to as a prior art). The prior art is characterized in that, when a defect is detected in a source code analyzed by a predefined analysis tool, "the defect correction method is presented to the user." That is to say, the prior art simply presents the user the defect correction method, and it is the user (programmer) who has to directly perform the defect correction. Therefore, even in the prior art, there still exists a limit that the correction of the detected defect has to depend on the personal knowledge and experiences of the user (programmer). When thousands to tens of thousands of the defects are detected, a lot of time is required to correct the detected defects one by one.

Accordingly, a method and a tool for automatically correcting the detected defects are required without direct correction of the detected defects by the user (programmer).

SUMMARY

One embodiment is a method for correcting violation of a source code, the method comprises: a violation detection step in which a source code is analyzed and one or multiple violations are detected; a correction information generation step in which multiple pieces of the correction information for correcting the detected violation are generated; a correction information merging step in which the multiple pieces of the generated correction information are merged; and a correction step in which the source code is corrected on the basis of the merged correction information.

Each of the multiple pieces of the correction information may include at least any one of a correction start line number, correction contents, correction types, and order.

In the correction information merging step, the multiple pieces of the correction information may be merged by arranging the order of the multiple pieces of the correction information. In the correction step, the source code may be corrected according to the order.

When the one or multiple violations detected in the violation detection step are additions or deletions of two or more continuous lines, information on the additions or deletions of the two or more continuous lines may be included in one piece of the correction information in the correction information merging step.

In the correction information merging step, the multiple pieces of the generated correction information may be merged by a predetermined rule. The predetermined rule may include: a step in which the multiple pieces of the correction information are arranged by the order of the correction start line; a step in which, when there are the multiple pieces of the correction information on any one line, the multiple pieces of the correction information are arranged in the order of Modify-Delete-Add; and a step in which, when there are two or more pieces of the correction information on the deletion of the any one line, one piece of merging correction information is generated by a predetermined merging rule, and when two or more pieces of the correction information on the deletion of the any one line, only the correction information on the deletion of the most lines is selected, and when two or more pieces of the correction information on the addition to the any one line, the pieces of the correction information are arranged by a predefined order.

The predetermined merging rule may include: an arrangement step in which two or more pieces of the correction information are arranged by an order included in each of the two or more pieces of the correction information; an addition step in which the an indexer is added to a source code original for the any one line and is added to a first column of each of the two or more pieces of the correction information; and a determination step in which the merging correction information is determined by comparing letters pointed to by all the added indexers, and movements of all the indexers are determined.

The determination step may include: a step in which, when the letters pointed to by all the indexers are the same, the same letter is added to a first column of the merging correction information, and all the indexers are moved to the next column; and a step in which, when any one of the letters pointed to by all the indexers is different from the others and the others are the same, the movements of all the indexers and the merging correction information are determined by any one of the following (a), (b), and (c). (a) When a type of the correction information to which the any one letter belongs is insert, the any one letter is added to the first column of the merging correction information, and only the indexer of the correction information to which the any one letter belongs is moved to the next column. (b) When the type of the correction information to which the any one letter belongs is delete, no letter is added to the first column of the merging correction information, and remaining indexers other than the indexer of the correction information to which the any one letter belongs are moved to the next column. (c) When the type of the correction information to which the any one letter belongs is replace, the any one letter is added to the first column of the merging correction information, and all the indexers are moved to the next column.

A computer readable recording medium having a program performing the method for correcting violation of a source code in accordance with the above-described embodiments is included.

BRIEF DESCRIPTION OF THE DRAWINGS

FIGS. 2 to 18 are views for describing an example of the method for correcting violation of a source code in accordance with the embodiment of the present invention shown in FIG. 1;

FIGS. 19 to 25 are views for describing another example of the method for correcting violation of a source code in accordance with the embodiment of the present invention shown in FIG. 1;

FIGS. 26 to 31 are views for describing further another example of the method for correcting violation of a source code in accordance with the embodiment of the present invention shown in FIG. 1;

DETAILED DESCRIPTION

Figure 1:
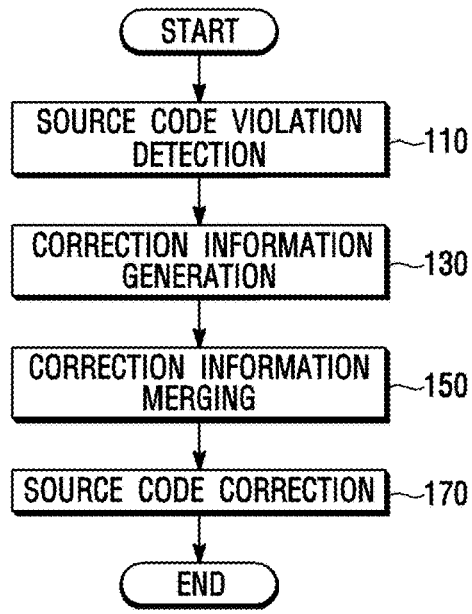
FIG. 1 is a flowchart for describing a method for correcting violation of a source code in accordance with an embodiment of the present invention.

Hereafter, an exemplary embodiment of the present invention will be described in detail with reference to the accompanying drawings. It is noted that the same reference numerals are used to denote the same elements throughout the drawings. In the following description of the present invention, the detailed description of known functions and configurations incorporated herein is omitted when it may make the subject matter of the present invention unclear. Hereafter, a method for correcting violation of a source code and a computer readable recording medium having a program performing the same in accordance with the embodiment of the present invention will be described below with reference to the accompanying drawings.

FIG. 1 is a flowchart for describing a method for correcting violation of a source code in accordance with an embodiment of the present invention.

Referring to FIG. 1, the method for correcting violation of a source code in accordance with the embodiment of the present invention includes a violation detection step 110, a correction information generation step 130, a correction information merging step 150, and a correction step 170. Hereafter, each of the steps will be described in detail.

In the violation detection step 110, the input source code is analyzed and one or multiple violations are detected.

The source code may be received in the form of a code file. For example, the code file input may be performed by user's file input or off manipulation.

The source code may be analyzed by a program such as a static analysis tool. The static analysis tool may have a variety of methods such as a syntactic analysis method, a semantic analysis method, or the like. Through use of the static analysis tool, the violation of a predefined rule can be detected.

In the correction information generation step 130, one or multiple pieces of the correction information for correcting the violation detected in the violation detection step 110 are generated.

In the correction information, a difference between a source code where the violation exists and a source code corrected by the rule may be recorded and stored by a specific unit. Here, the correction information may have a unified diff format.

The correction information may include at least any one of a correction start line number, correction contents, correction types (e.g., addition, deletion, change), and order. Also, the correction information may further include violation details.

Here, the order is determined in consideration of the line number, correction type, and code block depth of violation occurrence location. The foremost number of the order may represent the line number. The next number may be determined by the correction type (e.g., "1" for modification, "2" for addition, and "3" for deletion). The next numbers may be determined by the code block depth of violation occurrence location.

The multiple pieces of the correction information may be generated in the correction information generation step 130.

For example, when two or more discontinuous lines are added (or deleted), the number of the pieces of the correction information may be determined by the number of the added (or deleted) lines. Also, the number of the pieces of the correction information may be determined by the number of the modifications (e.g., addition, deletion, change) of one or more columns existing within any one particular line. For example, this will be described with reference to the following tables.

TABLE 1

| | current source code | corrected source code |
|---|---|---|
| Line 1 | aaaaa | aaaaa |
| Line 2 | ccccc | bbbbb |
| Line 3 | eeeee | ccccc |
| Line 4 | | ddddd |
| Line 5 | | eeeee |

The table 1 assumes that one or multiple violations exist in a current source code, for the purpose of correcting the one or multiple violations, one line (bbbbb) should be added after the line 1 of the current source code, and one line (ddddd) should be added after the line 3 of the current source code. In the case of the table 1, the number of the pieces of the generated correction information is 2 as follows.
    correction information 1: @@-1,0 +1,1 @@
    +bbbbb
    correction information 2: @@-3,0 +3,1 @@
    +ddddd

TABLE 2

|  | current source code | corrected source code |
|---|---|---|
| Line 1 | aaaaa | aaaaa |
| Line 2 | bbbbb | ccccc |
| Line 3 | ccccc | eeeee |
| Line 4 | ddddd |  |
| Line 5 | eeeee |  |

The table 2 assumes that one or multiple violations exist in the current source code, for the purpose of correcting the one or multiple violations, the line (bbbbb) after the line 1 of the current source code should be deleted, and the line (ddddd) after the line 3 of the current source code should be deleted. In the case of the table 2, the number of the pieces of the generated correction information is 2 as follows.
    correction information 1: @@-1,0 +1,1 @@
    -bbbbb
    correction information 2: @@-3,0 +3,1 @@
    -ddddd

TABLE 3

|  | current source code | corrected source code |
|---|---|---|
| Line 1 | aabbcc | aazzbbee |

The table 3 assumes that one or multiple violations exist in the current source code, for the purpose of correcting the one or multiple violations, a new column (zz) should be added after the column (aa) within the line 1 of the current source code, and another column (cc) within the line 1 of the current source code should be changed into a new column (ee). In the case of the table 3, the number of the pieces of the generated correction information is 2 as follows.
    correction information 1: @@-1,1 +1,1 @@
    -aabbcc
    +aazzbbcc
    correction information 2: @@-1,1 +1,1 @@
    -aabbcc
    +aabbee Meanwhile, the correction information generated in the correction information generation step 130 may include two or more correction contents. For example, when two or more continuous lines should be added or deleted in order to correct one or multiple detected violations, one piece of the correction information may include information on the additions or deletions of the two or more continuous lines. For example, this will be described with reference to the following tables.

TABLE 4

|  | current source code | corrected source code |
|---|---|---|
| Line 1 | aaaaa | aaaaa |
| Line 2 | bbbbb | bbbbb |
| Line 3 | eeeee | ccccc |
| Line 4 |  | ddddd |
| Line 5 |  | eeeee |

TABLE 4-continued

| current source code | corrected source code |
|---|---|

The table 4 assumes that one or multiple violations exist in the current source code, for the purpose of correcting the one or multiple violations, two or more continuous lines, i.e., two lines (ccccc, ddddd) should be added after the line 2. In the case of the table 4, the number of the pieces of the generated correction information is 1 as follows.
    correction information: @@-2,0 +2,2 @@
    +ccccc
    +ddddd

TABLE 5

|  | current source code | corrected source code |
|---|---|---|
| Line 1 | aaaaa | aaaaa |
| Line 2 | bbbbb | bbbbb |
| Line 3 | ccccc | eeeee |
| Line 4 | ddddd |  |
| Line 5 | eeeee |  |

The table 5 assumes that one or multiple violations exist in the current source code, for the purpose of correcting the one or multiple violations, two or more continuous lines, i.e., the line 3 (ccccc) and the line 4 (ddddd) should be deleted. In the case of the table 5, the number of the pieces of the generated correction information is 1 as follows.
    correction information: @@-2,2 +2,0 @@
    -ccccc
    -ddddd In the correction information merging step 150, the multiple pieces of the generated correction information are merged. Therefore, when only one piece of the correction information is generated in the correction information generation step 130, this step 150 can be omitted.

In the correction information merging step 150, the multiple pieces of the correction information are merged by a predetermined rule. The predetermined rule may be as follows.

(1) The multiple pieces of the correction information are arranged by the order of the correction start line.

(2) In the case of the multiple pieces of the correction information on any one line, the multiple pieces of the correction information are arranged in the order of Modify-Delete-Add.

(3) In the case of two or more pieces of the correction information on the modification of any one line, merging correction information is generated by a predetermined merging rule. In the case of two or more pieces of the correction information on the deletion of any one line, only the correction information on the deletion of the most lines is selected. Also, in the case of two or more pieces of the correction information on the addition to any one line, the pieces of the correction information are arranged by the order included in each correction information.

(4) In the case of two or more pieces of the correction information on the modification of any one line, according to the predetermined merging rule for generating the merging correction information,
    a) Two or more pieces of the correction information are arranged by the order included in each of the two or more pieces of the correction information.

b) An indexer is added to a source code original for any one line and is added to the first column of each of the two or more pieces of the correction information.

c) The merging correction information is determined by comparing the letters pointed to by all the added indexers, and the movements of all the indexers are determined.

Here, the above c) will be described in more detail. If the letters pointed to by all the indexers are the same, the same letter is added to the first column of the merging correction information, and all the indexers are moved to the next column.

Meanwhile, if any one of the letters pointed to by all the indexers is different from the others and the others are the same, the following three determination are made. When the type of the correction information to which any one letter belongs is insert, any one letter is added to the first column of the merging correction information, and only the indexer of the correction information to which any one letter belongs is moved to the next column. On the other hand, when the type of the correction information to which any one letter belongs is delete, no letter is added to the merging correction information, and remaining indexers other than the indexer of the correction information to which any one letter belongs are moved to the next column. On the other hand, when the type of the correction information to which any one letter belongs is replace, any one letter is added to the first column of the merging correction information, and all the indexers are moved to the next column.

d) The source code original and the next column to the last column of each of the two or more pieces of the correction information follow the above-described merging correction information. When all the indexers point to the end, the operation is ended and the merging correction information is output.

In the correction step 170, the source code is corrected on the basis of the correction information merged in the correction information merging step 150. In the correction step 170, the source code is automatically corrected according to the order of the pieces of the correction information arranged by the above-described rules of (1) to (4) within the correction information merged in the correction information merging step 150.

Then, an example of the method for correcting violation of a source code in accordance with the embodiment of the present invention will be described below in detail with reference to the accompanying drawings.

FIGS. 2 to 18 are views for describing an example of the method for correcting violation of a source code in accordance with the embodiment of the present invention shown in FIG. 1.

Figure 2:
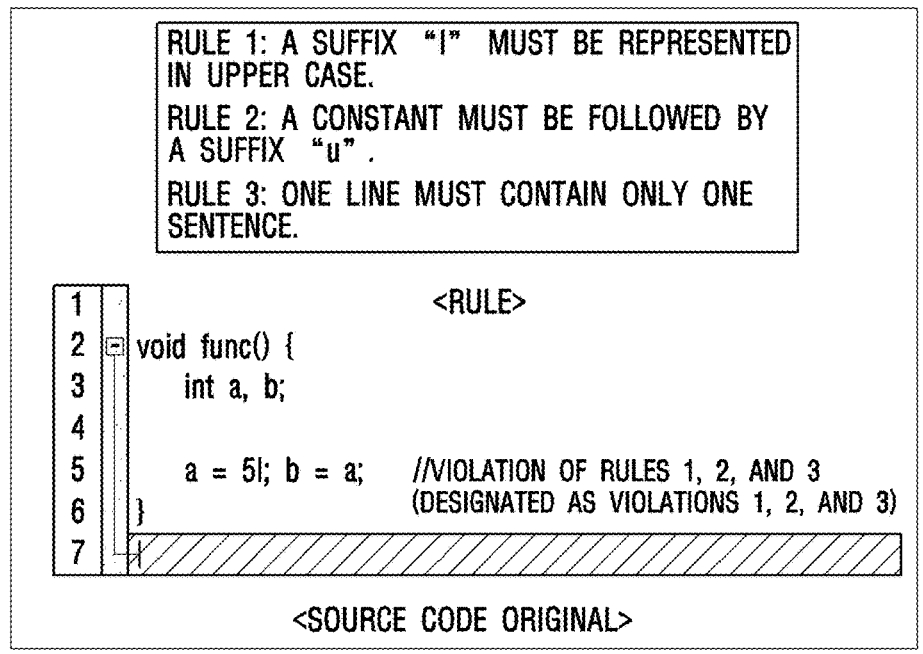

First, as shown in FIG. 2, it is assumed that there exist a predetermined <rule> and input <source code original>. It is assumed that there are three rules in the <rule>.

Rule 1: A suffix "1" must be represented in upper case.
Rule 2: A constant must be followed by a suffix "u".
Rule 3: One line must contain only one sentence.

In the violation detection step 110 shown in FIG. 1, as shown in FIG. 2, a violation 1, a violation 2, and a violation 3 are detected by analyzing the <source code original>.

In the correction information generation step 130 shown in FIG. 1, as shown in FIGS. 3 to 5, three pieces of the correction information are generated. Each of the generated three pieces of the correction information includes the correction start line number, correction contents, correction types, and order.

For example, a first correction information (diff 1) may include, as shown in FIG. 3,
"Modification of Line 5 to 'a=5L; b=a;', order 5120",
a second correction information (diff 2) may include, as shown in FIG. 4,
"Modification of Line 5 to 'a=5lu, b=a;', order 5120", and
a third correction information (diff 3) may include, as shown in FIG. 5,
"Modification of Line 5 to 'a=5l;', order 5120, and
Addition of 'b=a;' to the next line to Line 5, order 5220".

In the correction information merging step 150 shown in FIG. 1, the first to third pieces of the correction information (diff1, diff2, and diff 3) are merged into one piece of the correction information by the predetermined rule.

Specifically, in the correction information merging step 150, in accordance with the rule (1) of the above-described predetermined rule, the first to third pieces of the correction information (diff1, diff2, and diff 3) are arranged by the order of the correction start line. Here, in the above-given example, since the correction start lines of the first to third pieces of the correction information (diff1, diff2, and diff 3) are all Line 5, the order of the correction information is not changed by the predetermined rule (1).

Next, the pieces of the correction information are arranged as described below in the order of Modify-Delete-Add by the rule (2) of the predetermined rule.

① Modification of Line 5 to 'a=5L, b=a;', order 5120
② Modification of Line 5 to 'a=5lu, b=a;', order 5120
③ Modification of Line 5 to 'a=5l;', order 5120
④ Addition of 'b=a;' to the next line to Line 5, order 5220

Here, since there are two or more pieces of the correction information (①, ②, and ③) on the modification of Line 5, one piece of the merging correction information on ① to ③ is generated by the rule (3). The one piece of the merging correction information on ① to ③ is generated by the above-described predetermined merging rule. This will be described in detail with reference to FIGS. 6 to 16.

First, referring to FIG. 6, ① (diff 1) means that the letter "l" of column 4 of the source code original is modified to "L" (correction type: replace), ② (diff 2) means that the letter "u" is inserted after the column 4 of the source code original (correction type: insert), and ③ (diff 3) means that the letter of column 6 to column 9 of the source code original is deleted (correction type: delete). The merging correction information (mergedDiff) is one piece of the correction information obtained by merging the three pieces of the correction information. The indexer (*) is added to the source code original and the first columns of the pieces of the correction information.

In FIG. 6, all the indexers (*) point to the same letter of "a". Therefore, as shown in FIG. 7, "a" is added to column 1, i.e., the first column of the merging correction information (mergedDiff), and all the indexers (*) are moved to column 2 one by one.

In FIG. 7, all the indexers (*) point to the same letter of "=". Therefore, as shown in FIG. 8, "=" is added to the column 2 of the merging correction information (mergedDiff), and all the indexers (*) are moved to column 3 one by one.

In FIG. 8, all the indexers (*) point to the same letter of "5". Therefore, as shown in FIG. 9, "5" is added to the column 3 of the merging correction information (mergedDiff), and all the indexers (*) are moved to column 4 one by one.

In FIG. 9, all the indexers (*) point to the same letter except for "L", the correction type of the correction information (diff 1) to which "L" belongs is replace. Therefore, as shown in FIG. 10, "L" is added to the column 4 of the merging correction information (mergedDiff), and all the indexers (*) are moved to column 5 one by one.

In FIG. 10, all the indexers (*) point to the same letter except for "u", the correction type of the correction information (diff 2) to which "u" belongs is insert. Therefore, as shown in FIG. 11, "u" is added to the column 5 of the merging correction information (mergedDiff), and only the indexer (*) of the correction information (diff 3) to which "u" belongs is moved to column 6.

In FIG. 11, all the indexers (*) point to the same letter of ";". Therefore, as shown in FIG. 12, ";" is added to the column 6 of the merging correction information (mergedDiff), and all the indexers (*) are moved to the next column.

In FIG. 12, all the indexers (*) point to the same letter except for "_(empty string)", the correction type of the correction information (diff 3) to which "_(empty string)" belongs is delete. Therefore, as shown in FIG. 13, no letter is added to column 7 of the merging correction information, and remaining indexers (*) other than the indexer of the correction information (diff 3) to which "_(empty string)" belongs are moved to the next column. The same is true of the cases shown in FIGS. 13 to 15.

In FIG. 16, all the indexers (*) point to the end. Therefore, the operation is ended and the merging correction information (mergedDiff) which has been recorded so far is output.

When the process of FIG. 16 is completed, the three pieces of the correction information (① to ③) is merged into one piece of the correction information as follows.

"Modification of Line 5 to 'a=5Lu;', order 5120"

Eventually, one piece of the correction information generated in the correction information merging step 150 shown in FIG. 1 is composed of the following two strings (diff), not four strings.

Modification of Line 5 to 'a=5Lu;', order 5120 (three diffs are merged)

Addition of 'b=a;' to the next line to Line 5, order 5220

In the correction step 170 shown in FIG. 1, as shown in FIGS. 17 to 18, the source code is corrected by the order in which the string within one piece of the correction information (including two diffs) generated in the correction information merging step 150 is arranged.

First, as shown in FIG. 17, the original on the left side is changed to what is shown on the right side in accordance with the first string (Modification of Line 5 to 'a=5Lu;', order 5120) within one piece of the correction information. As shown in FIG. 18, the original on the left side is changed to what is shown on the right side in accordance with the second string (Addition of 'b=a;' to the next line to Line 5, order 5220) within one piece of the correction information.

Referring to the corrected source code on the right side of FIG. 18, it can be found that the source code shown in FIG. 2 has been automatically corrected by method for correcting violation of a source code in accordance with the embodiment of the present invention.

FIGS. 19 to 25 are views for describing another example of the method for correcting violation of a source code in accordance with the embodiment of the present invention shown in FIG. 1.

First, as shown in FIG. 19, it is assumed that there exist a predetermined <rule> and input <source code original>. It is assumed that there is one rule in the <rule>.

Rule 1: An if statement must have a brace.

In the violation detection step 110 shown in FIG. 1, as shown in FIG. 19, a violation 1 and a violation 2 are detected by analyzing the <source code original>.

In the correction information generation step 130 shown in FIG. 1, as shown in FIGS. 20 to 21, two pieces of the correction information (diff1, diff2) are generated. Each of the generated two pieces of the correction information includes the correction start line number, correction contents, correction types, and order.

For example, a first correction information (diff 1) may include, as shown in FIG. 20, "Addition of '{' to the next line to Line 5, order: 520
Addition of '}' to the next line to Line 7, order: 720", and a second correction information (diff 2) may include, as shown in FIG. 21, "Addition of '{' to the next line to Line 6, order: 610
Addition of '}' to the next line to Line 7, order 710".

In the correction information merging step 150 shown in FIG. 1, the pieces of the generated correction information (diff1 and diff2) are merged into one piece of the correction information.

Specifically, in the correction information merging step 150, in accordance with the rule (1) of the above-described predetermined rule, the first and second pieces of the correction information (diff1 and diff2) are arranged by the order of the correction start line. Since the correction start lines of the first correction information (diff1) is Line 5 and the correction start lines of the second correction information (diff2) is Line 6, the pieces of the correction information are arranged as follows.

① Addition of '{' to the next line to Line 5, order: 520
② Addition of '}' to the next line to Line 7, order: 720
③ Addition of '{' to the next line to Line 6, order: 610
④ Addition of '}' to the next line to Line 7, order 710

Next, the pieces of the correction information are arranged in the order of Modify-Delete-Add by the rule (2) of the predetermined rule. Since the correction type of this example is addition, the arrangement order is not changed.

However, since there are two or more pieces of the correction information (② and ④) on the addition to Line 7, the pieces of the correction information are arranged as follows according to the order included in each correction information by the rule (3).

Addition of '{' to the next line to Line 5, order: 520
Addition of '{' to the next line to Line 6, order: 610
Addition of '}' to the next line to Line 7, order 710
Addition of '}' to the next line to Line 7, order: 720

In the correction step 170 shown in FIG. 1, as shown in FIGS. 22 to 25, the source code is corrected on the basis of one piece of the correction information (including four diffs) generated in the correction information merging step 150.

Figure 23:
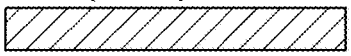
Figure 24:
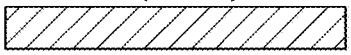

FIG. 22 shows that the original on the left side is changed to what is shown on the right side on the basis of the first string (Addition of '{' to the next line to Line 5, order: 520) within one piece of the correction information. FIG. 23 shows that the original on the left side is changed to what is shown on the right side on the basis of the second string (Addition of '{' to the next line to Line 6, order: 610) within one piece of the correction information. FIG. 24 shows that the original on the left side is changed to what is shown on the right side on the basis of the third string (Addition of '}' to the next line to Line 7, order 710) within one piece of the correction information. FIG. 25 shows that the original on the left side is changed to what is shown on the right side on the basis of the fourth string (Addition of '}' to the next line to Line 7, order: 720) within one piece of the correction information.

Referring to the corrected source code on the right side of FIG. 25, it can be found that the source code shown in FIG. 19 has been automatically corrected by the method for correcting violation of a source code in accordance with the embodiment of the present invention.

FIGS. 26 to 31 are views for describing further another example of the method for correcting violation of a source code in accordance with the embodiment of the present invention.

First, as shown in FIG. 26, it is assumed that there exist a predetermined <rule> and input <source code original>. It is assumed that there are two rules in the <rule>.

Rule 1: An if statement must have a brace.
Rule 2: An if statement must have an else statement.

In the violation detection step 110 shown in FIG. 1, as shown in FIG. 26, a violation 1 and a violation 2 are detected by analyzing the <source code original>.

In the correction information generation step 130 shown in FIG. 1, as shown in FIGS. 27 to 28, two pieces of the correction information are generated. Each of the generated two pieces of the correction information includes the correction start line number, correction contents, correction types, and order.

For example, a first correction information (diff 1) may include, as shown in FIG. 27, "Addition of '{' to the next line to Line 3, order: 320
Addition of '}' to the next line to Line 4, order: 420", and a second correction information (diff 2) may include, as shown in FIG. 28, "Addition of 'else', '{', '}' to the next line to Line 4, order: 421".

In the correction information merging step 150 shown in FIG. 1, the pieces of the generated correction information (diff1 and diff2) are merged into one piece of the correction information.

Specifically, in the correction information merging step 150, in accordance with the rule (1) of the above-described predetermined rule, the first and second pieces of the correction information (diff1 and diff2) are arranged by the order of the correction start line. Since the correction start lines of the first correction information (diff1) is Line 3 and the correction start lines of the second correction information (diff2) is Line 4, the pieces of the correction information are arranged as follows.

① Addition of '{' to the next line to Line 3, order: 320
② Addition of '}' to the next line to Line 4, order: 420
③ Addition of 'else', '{', '}' to the next line to Line 4, order: 421

Next, the pieces of the correction information are arranged in the order of Modify-Delete-Add by the rule (2) of the predetermined rule. Since the correction type of this example is addition, the arrangement order is not changed.

However, since there are two or more pieces of the correction information (② and ③) on the addition to Line 4, the pieces of the correction information are arranged according to the order included in each correction information by the rule (3). Here, since ② has a higher order than that of ③, the arrangement order is not changed.

Figure 31:
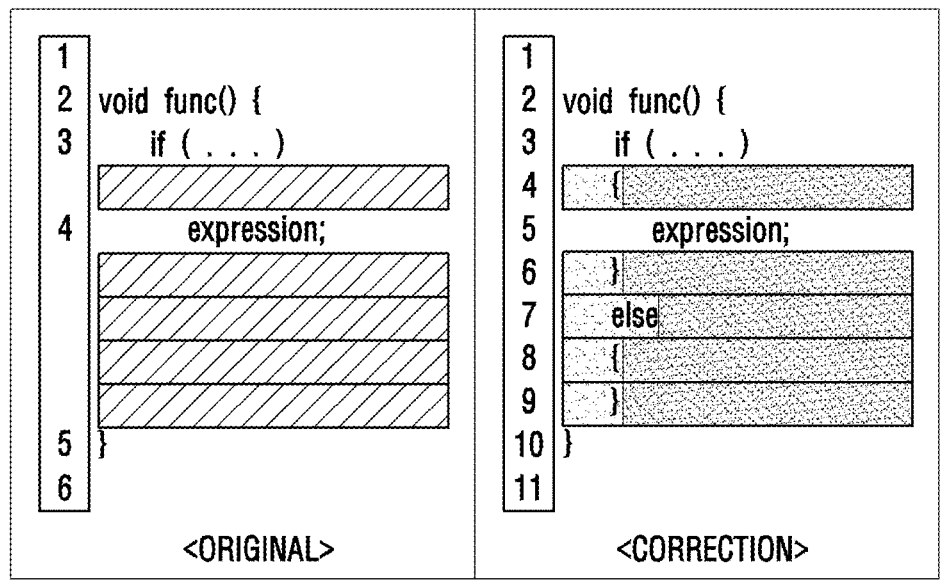

In the correction step 170 shown in FIG. 1, as shown in FIGS. 29 to 31, the source code is corrected on the basis of one piece of the correction information (including three diffs) generated in the correction information merging step 150.

FIG. 29 shows that the original on the left side is changed to what is shown on the right side on the basis of the first string (Addition of '{' to the next line to Line 3, order: 320) within one piece of the correction information. FIG. 30 shows that the original on the left side is changed to what is shown on the right side on the basis of the second string (Addition of '}' to the next line to Line 4, order: 420) within one piece of the correction information. FIG. 31 shows that the original on the left side is changed to what is shown on the right side on the basis of the third string (Addition of 'else', '{', '}' to the next line to Line 4, order: 421) within one piece of the correction information.

Referring to the corrected source code on the right side of FIG. 31, it can be found that the source code shown in FIG. 26 has been automatically corrected by the method for correcting violation of a source code in accordance with the embodiment of the present invention.

Figure 32:
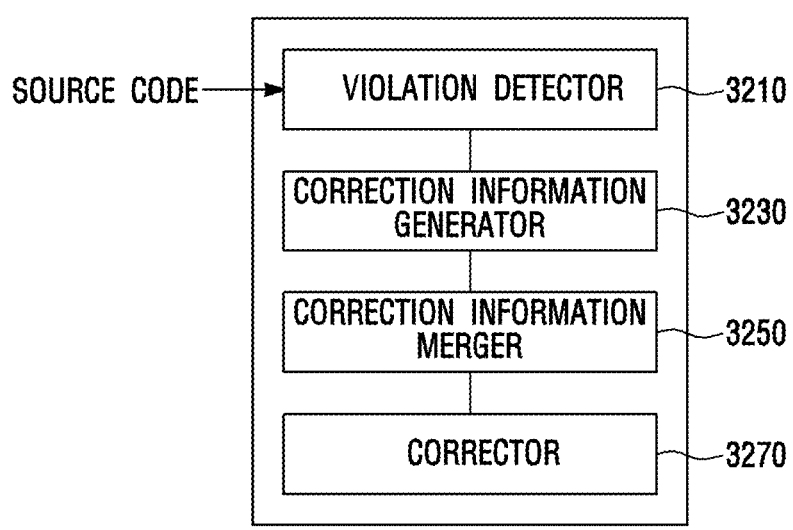
FIG. 32 is a block diagram of a module for correcting violation of a source code in accordance with the embodiment of the present invention.

FIG. 32 is a block diagram of a module for correcting violation of a source code in accordance with the embodiment of the present invention.

Referring to FIG. 32, the module for correcting violation of a source code in accordance with the embodiment of the present invention includes a violation detector 3210, a correction information generator 3230, a correction information merger 3250, and a corrector 3270.

The violation detector 3210 performs the violation detection step 110 of FIG. 1. The correction information generator 3230 performs the correction information generation step 130 of FIG. 1. The correction information merger 3250 performs the correction information merging step 150 of FIG. 1. The corrector 3270 performs the correction step 170 of FIG. 1. Therefore, the descriptions of the violation detector 3210, the correction information generator 3230, the correction information merger 3250, and the corrector 3270 will be replaced by the foregoing description.

The method for correcting violation of a source code in accordance with the embodiment of the present invention described in FIGS. 1 to 31 may be implemented in the form of a program instruction that can be executed by various computer components and may be recorded in a computer readable recording medium. The computer readable recording medium may include the program instruction, data file, data structure, etc., individually or in a combination thereof.

The program instruction which is recorded in the computer readable recording medium may be specially designed and configured for the present invention or may be well-known and available to those skilled in the field of computer software.

The example of the computer readable recording medium includes a magnetic medium such as a hard disk, a floppy disk, and a magnetic tape, an optical recording medium such as a CD-ROM and DVD, a magneto-optical medium such as a floptical disk, and a hardware device which is specially configured to store and execute program instructions such as ROM, RAM, flash memory, etc. The example of the program instruction includes an advanced language code which can be executed by using an interpreter, etc., by a computer as well as a machine language code which is created by a compiler. The hardware device may be configured to operate as at least one software module in order to perform the processes according to the present invention, and vice versa.

FIGS. 33 to 38 show examples of an image in which a computer readable recording medium (so called, "a tool for correcting violation of a source code") recording the method for correcting violation of a source code in accordance with the embodiment of the present invention described in FIGS. 1 to 31 is installed and performed in a computer and then is being displayed on a display of the computer.

Figure 33:
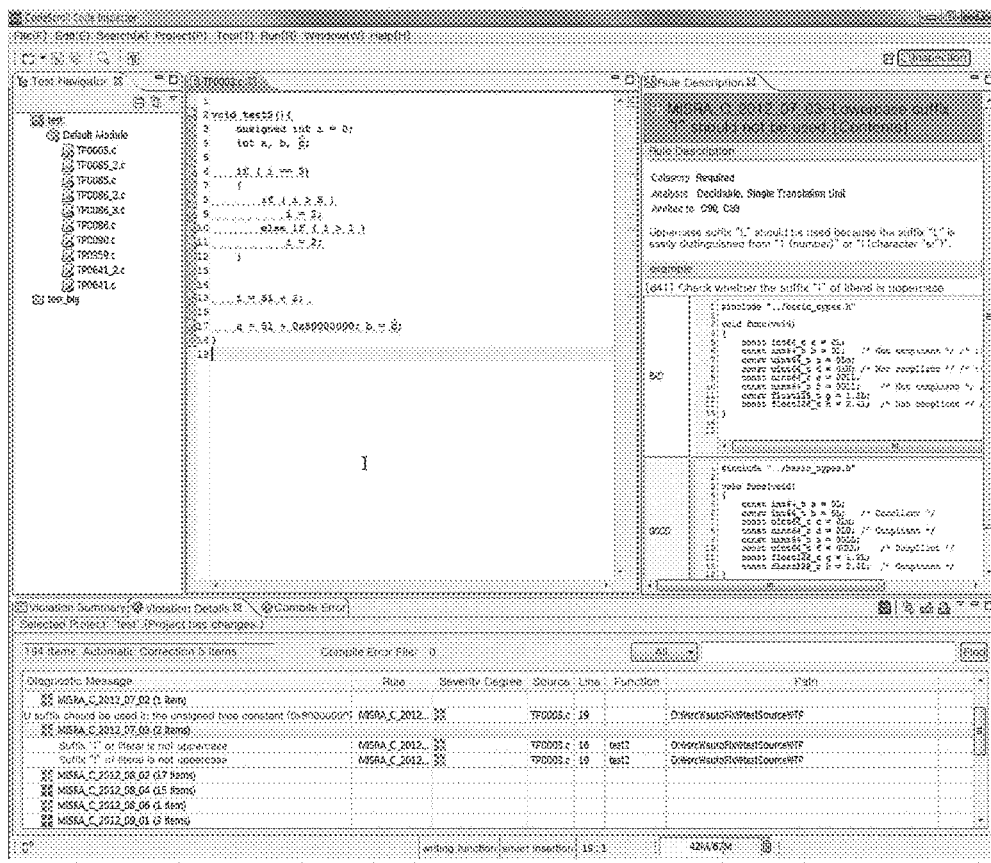
FIGS. 33 to 38 show examples of an image in which a computer readable recording medium (so called, "a tool for correcting violation of a source code") recording the method for correcting violation of a source code in accordance with the embodiment of the present invention described in FIGS. 1 to 31 is installed and performed in a computer and then is being displayed on a display of the computer.

FIG. 33 shows a full image of the source code violation correction tool.

Figure 34:
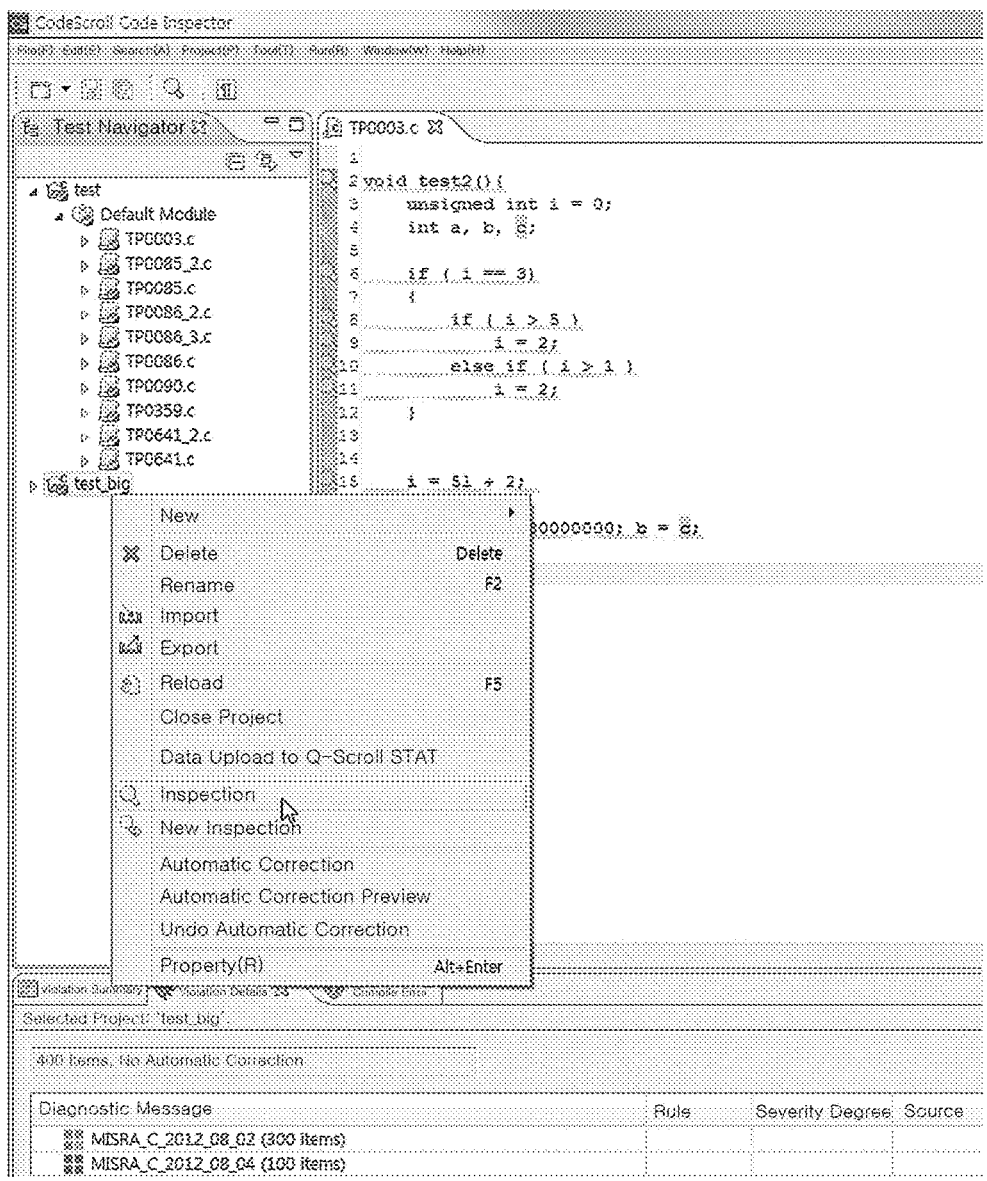

FIG. 34 shows an image showing that the user selects "inspection" in order to analyze the source code original created by the user.

Figure 35:
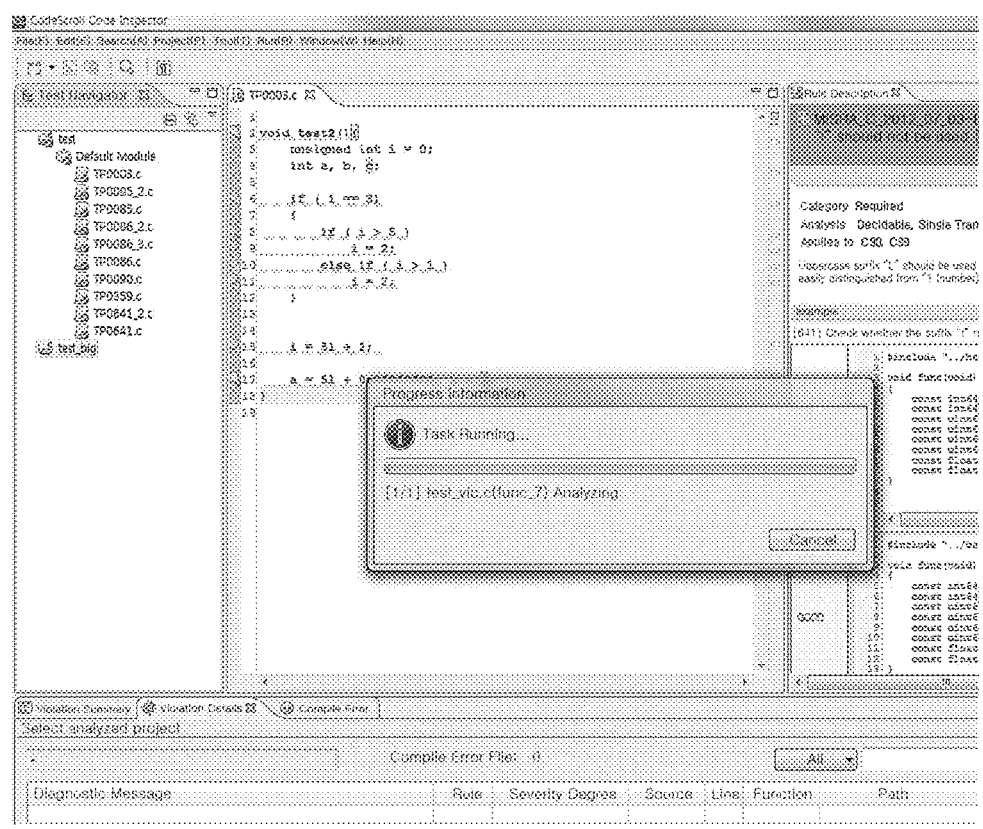

FIG. 35 shows that the source code violation correction tool analyzes the source code, detects the violation, and generates the correction information when the user clicks the inspection in FIG. 34.

Figure 36:
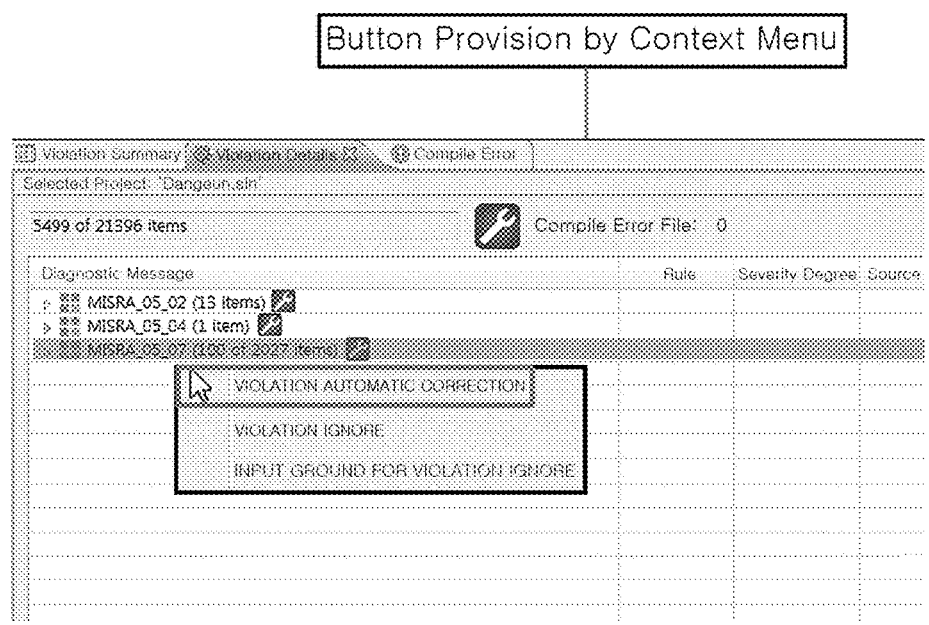

FIG. 36 shows an example of an execution image showing that the source code is automatically corrected.

Figure 37:
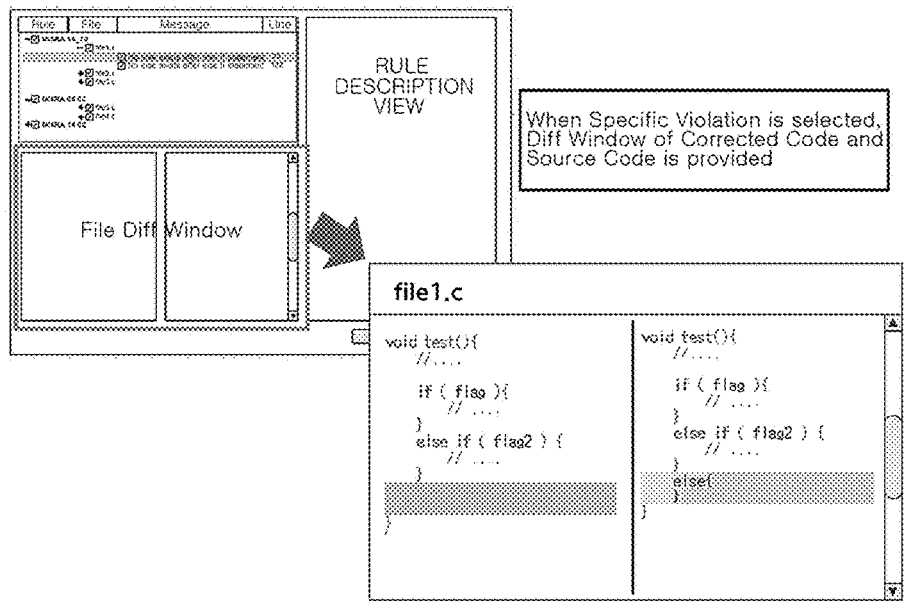

FIG. 37 shows an example showing a new window comparing the corrected code with the source code original when the user selects a specific violation in FIG. 36.

Figure 38:
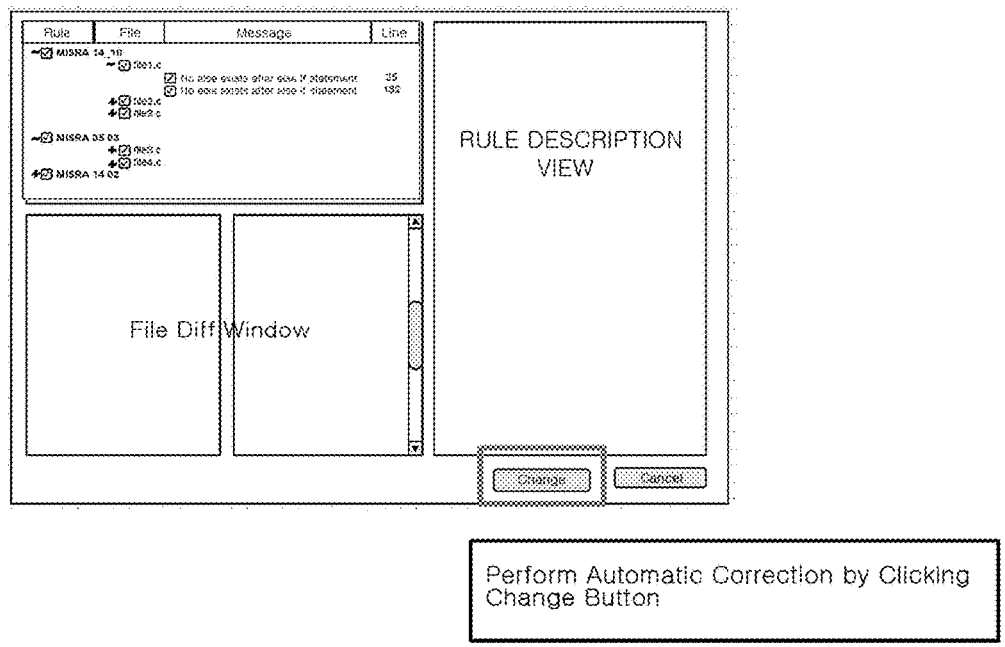

FIG. 38 shows an example of an image with a "change" button allowing the source code violation correction tool to automatically change the source code. When the user clicks the change button, the source code original created by the user is automatically corrected.

While the embodiment of the present invention has been described with reference to the accompanying drawings, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A method for correcting violation of a source code, the method comprising:
analyzing source code;
detecting a plurality of violations in the source code based on the analysis;
generating a plurality of pieces of correction information for correcting the detected plurality of violations, each of the plurality of pieces of correction information associated with a corresponding one of the detected plurality of violations;
merging the plurality of pieces of correction information into a single piece of correction information; and
correcting the detected plurality of violations in the source code based on the single piece of correction information.

2. The method of claim 1, wherein each of the plurality of pieces of correction information comprises at least any one of a correction start line number, correction contents, correction types, and order.

3. The method of claim 2, wherein merging the plurality of pieces of correction information comprises arranging the plurality of pieces of correction information based on the order, and wherein the source code is corrected according to the order.

4. The method of claim 1, wherein, when the plurality of violations are additions or deletions of two or more continuous lines, information on the additions or deletions of the two or more continuous lines is included in one of the plurality of pieces of correction information.

5. The method of claim 2,
wherein, the plurality of pieces of correction information are merged by a predetermined rule,
wherein the predetermined rule comprises:
a rule in which the plurality of pieces of correction information are arranged by the order of the correction start line;
a rule in which, when there are the plurality of pieces of correction information on any one line, the plurality of pieces of correction information are arranged in the order of Modify-Delete-Add; and
a rule in which, when there are two or more of the plurality of pieces of correction information on the deletion of the any one line, one piece of the plurality of pieces of correction information is generated by a predetermined merging rule, and when two or more of the plurality of pieces of correction information on the deletion of the any one line, only a piece of correction information on the deletion of the most lines is selected, and when two or more of the plurality of pieces of correction information on the addition to the any one line, the plurality of pieces of correction information are arranged by a predefined order.

6. The method of claim 5,
wherein the predetermined merging rule comprises:
arranging two or more of the plurality of pieces of correction information by an order included in each of the two or more of the plurality of pieces of correction information;
adding an index to original source code for the any one line and the index is added to a first column of each of the two or more of the plurality of pieces of correction information; and
wherein the merging of the plurality of pieces of correction information is determined by comparing letters pointed to by all the added indexers, and determining movements of all the indexers.

7. The method of claim 6,
wherein the determination of the merging of the plurality of pieces of correction information comprises:
when the letters pointed to by all the indexers are the same, adding a same letter to a first column of the single piece of correction information, and all the indexers are moved to the next column; and
when any one of the letters pointed to by all the indexers is different from the others and the others are the same, the movements of all the indexers and the merging correction information are determined by any one of the following (a), (b), and (c),
(a) When a type of the correction information to which the any one letter belongs is insert, adding the any one letter is added to the first column of the single piece of correction information, and only the indexer of the correction information to which the any one letter belongs is moved to the next column,
(b) When the type of the correction information to which the any one letter belongs is delete, no letter is added to the first column of the single piece of correction information, and remaining indexers other than the indexer of the correction information to which the any one letter belongs are moved to the next column,
(c) When the type of the correction information to which the any one letter belongs is replace, adding the any one letter to the first column of the single piece of correction information, and all the indexers are moved to the next column.

8. A non-transitory computer readable recording medium having a program for correcting violation of a source code, the program when executed by at least one computer processor causes the computer processor to perform steps comprising:
analyzing source code;
detecting a plurality of violations in the source code based on the analysis;
generating a plurality of pieces of correction information for correcting the detected plurality of violations, each of the plurality of pieces of correction information associated with a corresponding one of the detected plurality of violations;

merging the plurality of pieces of correction information into a single piece of correction information; and correcting the detected plurality of violations in the source code based on the single piece of correction information.

9. The non-transitory computer readable recording medium of claim 8, wherein each of the plurality of pieces of correction information comprises at least any one of a correction start line number, correction contents, correction types, and order.

10. The non-transitory computer readable recording medium of claim 9, wherein merging the plurality of pieces of correction information comprises arranging the order of the plurality of pieces of correction information, and wherein the source code is corrected according to the order.

11. The non-transitory computer readable recording medium of claim 8, wherein, when the plurality of violations are additions or deletions of two or more continuous lines, information on the additions or deletions of the two or more continuous lines is included in one of the plurality of pieces of correction information.

12. The non-transitory computer readable recording medium of claim 9 wherein, the plurality of pieces of correction information are merged by a predetermined rule, wherein the predetermined rule comprises:

a rule in which the plurality of pieces of correction information are arranged by the order of the correction start line;

a rule in which, when there are the plurality of pieces of correction information on any one line, the plurality of pieces of correction information are arranged in the order of Modify-Delete-Add; and a rule in which, when there are two or more of the plurality of pieces of correction information on the deletion of the any one line, one piece of the plurality of pieces of correction information is generated by a predetermined merging rule, and when two or more of the plurality of pieces of correction information on the deletion of the any one line, only a piece of correction information on the deletion of the most lines is selected, and when two or more of the plurality of pieces of correction information on the addition to the any one line, the plurality of pieces of correction information are arranged by a predefined order.

13. The non-transitory computer readable recording medium of claim 12, wherein the predetermined merging rule comprises:

arranging two or more of the plurality of pieces of correction information by an order included in each of the two or more of the plurality of pieces of correction information;

adding an index to original source code for the any one line and the index is added to a first column of each of the two or more of the plurality of pieces of correction information; and wherein the merging of the plurality of pieces of correction information is determined by comparing letters pointed to by all the added indexers, and determining movements of all the indexers.

14. The non-transitory computer readable recording medium of claim 13 wherein the determination of the merging of the plurality of pieces of correction information comprises:

when the letters pointed to by all the indexers are the same, adding a same letter to a first column of the single piece of correction information, and all the indexers are moved to the next column; and when any one of the letters pointed to by all the indexers is different from the others and the others are the same, the movements of all the indexers and the merging correction information are determined by any one of the following (a), (b), and (c), (a) When a type of the correction information to which the any one letter belongs is insert, adding the any one letter is added to the first column of the single piece of correction information, and only the indexer of the correction information to which the any one letter belongs is moved to the next column, (b) When the type of the correction information to which the any one letter belongs is delete, no letter is added to the first column of the single piece of correction information, and remaining indexers other than the indexer of the correction information to which the any one letter belongs are moved to the next column, (c) When the type of the correction information to which the any one letter belongs is replace, adding the any one letter to the first column of the single piece of correction information, and all the indexers are moved to the next column.

* * * * *